United States Patent [19]

Kawamura et al.

[11] Patent Number: 5,278,821
[45] Date of Patent: Jan. 11, 1994

[54] CLEANING CARTRIDGE FOR AN OPTICAL RECORDING APPARATUS

[75] Inventors: Ichiro Kawamura, Osaka; Goro Naoki, Higashiosaka, both of Japan

[73] Assignee: Matsushita Electric Industrial Co., Ltd., Osaka, Japan

[21] Appl. No.: 827,117

[22] Filed: Jan. 28, 1992

[30] Foreign Application Priority Data

Sep. 18, 1990 [JP] Japan ................................ 2-249439

[51] Int. Cl.$^5$ ..................... G11B 7/12; G11B 23/00
[52] U.S. Cl. ....................... 369/71; 15/21.1; 15/250.001; 15/250.29; 369/292
[58] Field of Search ................. 369/71, 292; 360/128; 15/160, 250.29, 250.001, 21.1

[56] References Cited

U.S. PATENT DOCUMENTS

| 4,868,700 | 9/1989 | Fritsch et al. | 360/128 |
| 4,870,636 | 9/1989 | Yamamoto | 369/71 |
| 5,128,923 | 7/1992 | Hasegawa et al. | 369/292 |

FOREIGN PATENT DOCUMENTS

| 2-149987 | 6/1990 | Japan | 369/71 |
| 2-206079 | 8/1990 | Japan | 369/71 |
| 2-236881 | 9/1990 | Japan | 369/71 |

*Primary Examiner*—Stuart S. Levy
*Assistant Examiner*—Joseph A. Rhoa
*Attorney, Agent, or Firm*—Wenderoth, Lind & Ponack

[57] ABSTRACT

A cleaning cartridge for use with an optical recording apparatus cleans from outside of the apparatus, an object lens of an optical disc recording apparatus or the like having a separation type optical system and glass covers for covering projection windows through which lasers are projected. A brush (28) for use on an object lens and a brush (26) for cleaning the glass covers (18) can be moved from outside. In order to effect operation of the cleaner, the transfer base (movable portion including the object lens of the head) is adapted to be transferred by the magnet, the inclined face or a transfer means within the apparatus.

20 Claims, 8 Drawing Sheets

CLEANING CARTRIDGE FOR AN OPTICAL RECORDING APPARATUS

BACKGROUND OF THE INVENTION

The present invention generally relates to a cleaner for cleaning dirt attached onto optical components of an optical disc recording and the reproducing apparatus.

In recent years, the market for optical discs has been expanded such that they are now useful as non-contact and convertible mass memory media. Recording and reproducing apparatuses for optical discs are vulnerable to contamination by dirt from the outside. Dirt readily attaches onto the surfaces of exposed optical components such as object lenses and so on, and causes the transmission ratio of the optical components to be lowered thereby reducing the reliability of the optical disc apparatus for recording and reproducing the signals with laser lights. Therefore, equipment has been proposed for cleaning of exposed optical components within the apparatus, such as object lenses.

It is desirable to reduce the weight of the transfer portion of the head because such is required to quickly retrieve information stored on disc. Therefore, a recording and reproducing apparatus is provided and has a light head, called a separation type head and having an optical base including a laser light source, a detector, a transfer base for transferring an object lens and a driving apparatus mounted thereon and separated therefrom is adapted to be made.

FIG. 2 and FIG. 3 show an embodiment of a recording and reproducing apparatus having a separation type head. Reference numeral 1 denotes a cartridge with a disc 2 accommodated therein. The cartridge has opening portions 1a, 1b provided in it (see FIG. 4). Reference numeral 3 denotes a cartridge holder made of sheet metal which accommodates the cartridge 1. Reference numeral 4 represents a slider which is urged by a spring (not shown) in the directions shown by arrows Y1, Y2 in the drawing figures. The slider 4 is provided with oblique notches 4a in four locations as shown. The notches 4a are respectively engaged with four pins 3b mounted on the cartridge holder 3. The cartridge holder 3 is provided with an engagement portion 3c which is engaged with a pin 5c extending upwardly from a chassis 5a to prevent the cartridge holder 3 from being slid in the Y1 and Y2 directions. The slider 4 is provided with a lock portion 9 having a notch 9a formed therein. Reference numeral 10 denotes a lock lever which is rotatably supported by a pin 12 on the chassis 5a. A pin 13 mounted at one end of the lock lever 10 is adapted to engage with the notch 9a of the lock portion 9. The end portion 10a of the lock lever 10 is urged to be moved in the direction Y1. Reference numeral 6 represents an optical base with a laser light emitting portion, a detector and so on incorporated therein. The optical base 6 is secured on the chassis 5a.

FIG. 3 and FIG. 5 are views for illustrating transfer base 14, a disc motor 21 (hidden in FIG. 2), and so on. Positioning pins 7a, 7b, 8a, 8c are mounted on the chassis 5a. The disc motor 21 is mounted on a chassis 5a as shown in the drawing. The transfer base 14 is guided by guide shafts 16 (two), and is supported movably in Y1 and Y2 directions. The transfer base 14 has an object lens 15, an adsorption member 17 of a magnetic material, a reflection mirror 20, and a lens driving means (not shown) mounted thereon. The transfer base 14 is composed of a transfer means (not shown) for free transportation thereof in Y1 and Y2 directions. Reference numerals 18 and 19 denote glass covers for preventing dirt from penetrating into the transfer base 14 and the optical base 6 during passage of laser light therethrough (see FIG. 6).

In the recording and reproducing apparatus of the above described construction, a loading operation for the cartridge 1 is effected in the following manner. First, the cartridge 1 is moved in the Y2 direction (see FIG. 2), and the end portion of the cartridge 1 comes into contact against the lock lever end portion 10a. The lock lever 10 pivots in the direction indicated by arrow A to disconnect the engagement between the pin 13 and the notch 9a so that the slider 4 can slide in the Y2 direction. As the notches 4a of the slider 4 are engaged with the pins 3b of the cartridge holder 3, the cartridge holder 3 is lowered as it advances in the Y2 direction. In this condition, the disc 2 within the cartridge 1 is engaged with the motor 21.

It is difficult to clean without dismantling the above described apparatus when dirt has become attached on the object lens 15 or glass covers 18, 19. Therefore, it has been proposed to provide a cleaner for cleaning dirt attached on the object lens, including a cleaning brush 31 formed by hairs implanted on a disc 32 accommodated in a cartridge 1 as shown in, for example, FIG. 8 (this view is seen from the reverse face of the cartridge). However, with such conventional cleaner, dirt attached on the glass covers 18, 19 cannot be removed. Thus, in the recording and reproducing apparatus having a separation type of head, the dirt cannot be completely cleaned with the conventional cleaner.

SUMMARY OF THE INVENTION

Accordingly, the present invention has been developed with a view to substantially eliminating the above discussed drawbacks inherent in the prior art, and has for its essential object to provide a cleaner for cleaning dirt attached on optical components for an apparatus which effects the recording and reproducing operation of optical discs.

Another important object of the present invention is to provide an improved cleaner of simple construction for cleaning dirt attached on the surfaces of glass covers provided on a light passage of a separate type head without dismantling the apparatus.

In accomplishing these and other objects, according to one preferred embodiment of the present invention, there is provided a cleaner and a recording apparatus for an optical recording apparatus which includes a housing body having a portion approximately the same in shape as the outer shape of the above described cartridge, a first cleaning member provided in a position for contacting the above described object lens and being capable of being loaded into a recording and reproducing apparatus, a second cleaning member provided in a position for contacting the above described first optical component (glass cover) and second optical component (glass cover), a moving means for moving the first cleaning member and the second cleaning member, and a contact portion formed on the above described housing body. The head is approximately secured in a given position by the operation of a magnet secured on the above described housing body, inclined faces operatively cooperating with the first and second cleaning members, or the head moving means of the recording and reproducing apparatus so that the object lens and the first and second optical components may be easily cleaned with the first and second cleaning members from outside, thus improving the reliability of the optical disc apparatus.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
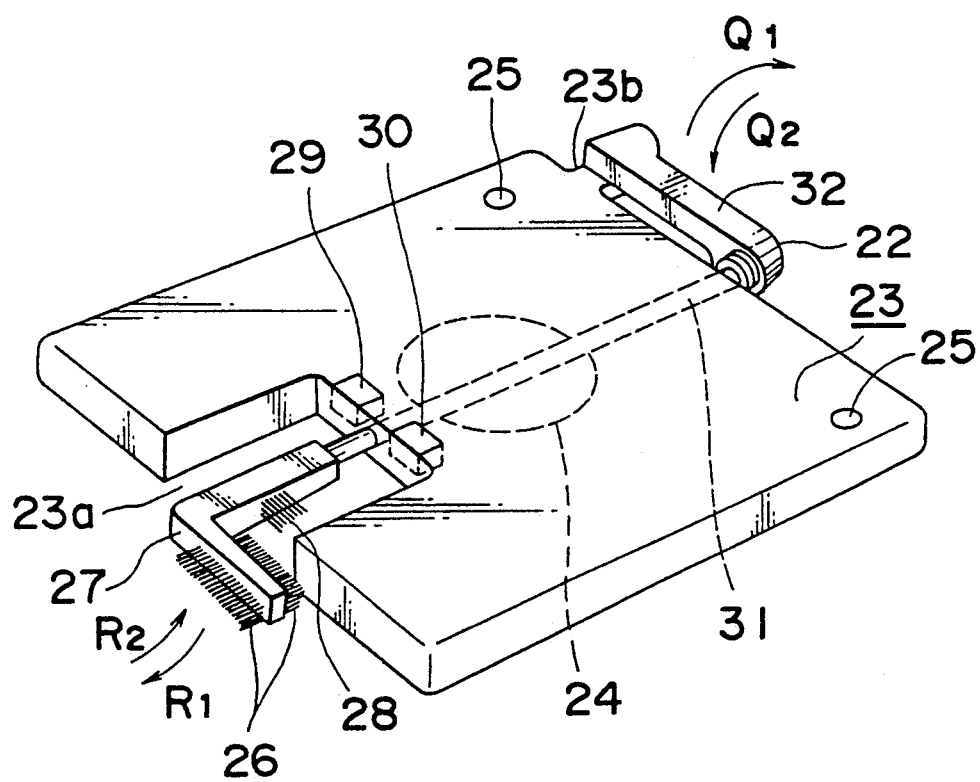
FIG. 1 is a perspective view of one embodiment of the present invention.
Figure 2:
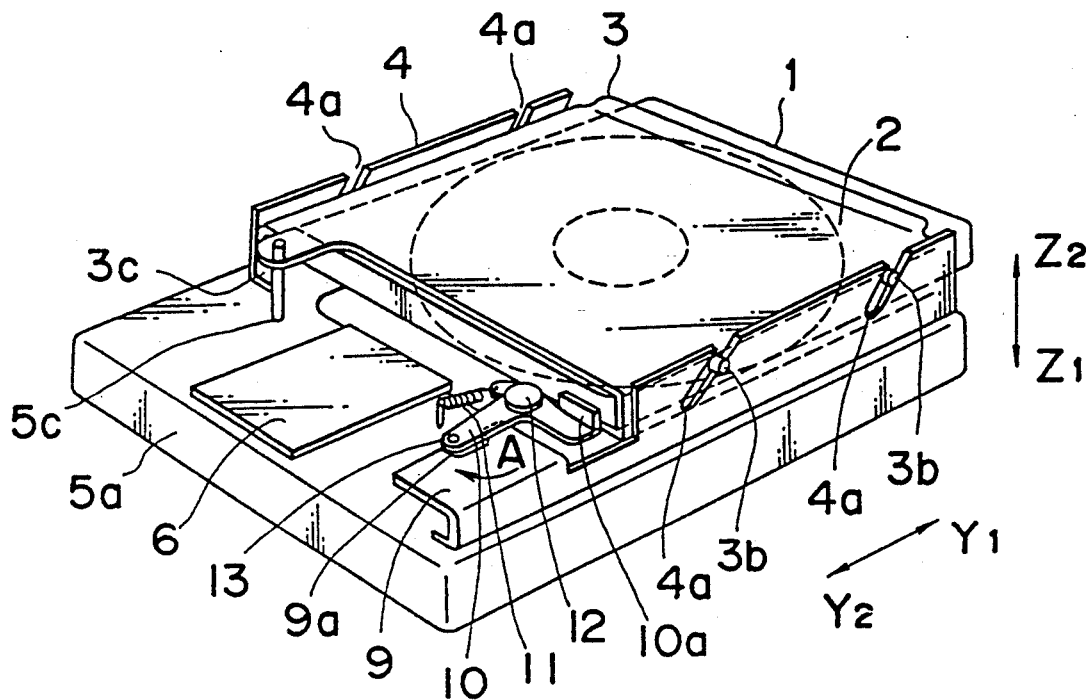
FIG. 2 and FIG. 3 are perspective views illustrating a conventional recording and reproducing apparatus.
Figure 3:
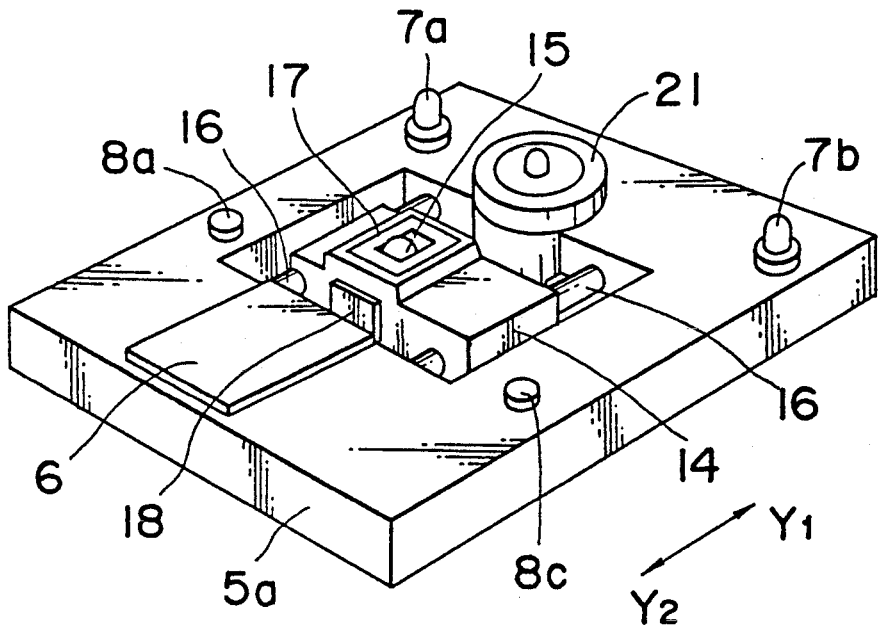
Figure 4:
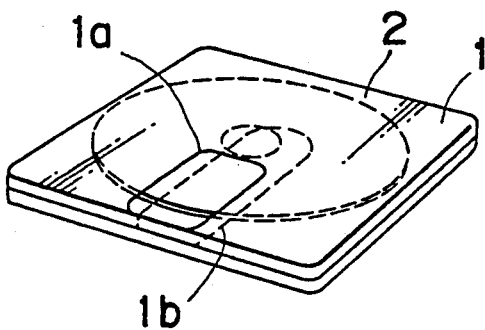
FIG. 4 is a perspective view of a recording disc accommodated in a cartridge.
Figure 5:
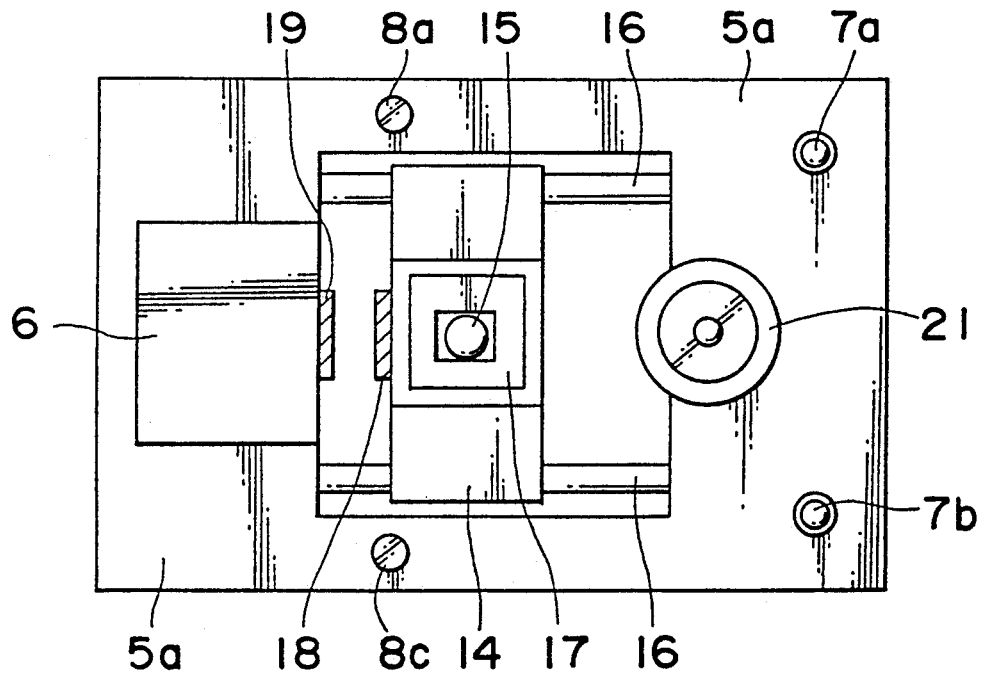
FIG. 5 and FIG. 6 are views for illustrating the essential portions of the recording and reproducing apparatus.
Figure 6:
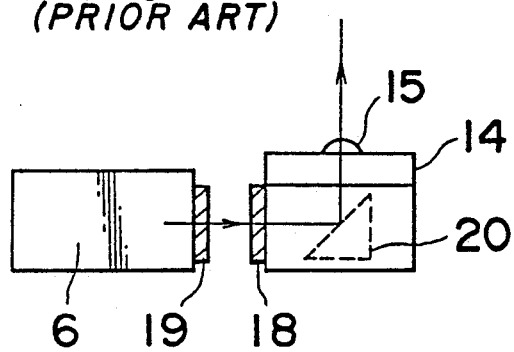

Before the description of the present invention proceeds, it is to be noted that like parts are designated by like reference numerals throughout the accompanying drawings.

Referring now to the drawings, there is shown in FIG. 1, a cleaner for use with an optical disc apparatus in accordance with the present invention. FIG. 1 shows one embodiment of the present invention. Reference numeral 23 is a housing body which is approximately similar in its outer shape to the cartridge 1. Holes 25 are formed in the body 23 for engagement with the positioning pins 7a, 7c of the apparatus, a cavity 24 is formed so that the body 23 avoids contact with a disc motor 21, and an angular notch 23a is formed in the body 23. Reference numerals 29 and 30 represent magnets buried in the housing body 23. Reference numeral 31 denotes a shaft extending through the housing body with a brush holder (or holder element) 27 being mounted on one side thereof, and a lever 32 on the other side thereof. Reference numeral 22 represents a torsion spring for urging the lever 32 in the direction shown in arrow Q2. The lever 32 is stopped as shown in FIG. 1 by a contact portion (or stopper means) 23b formed on the housing body 23. Brushes 28, 26 are mounted on the holder 27. They are pivoted in a direction shown by arrow R1 when the lever 32 is pivoted in the direction Q1.

Figure 7A:
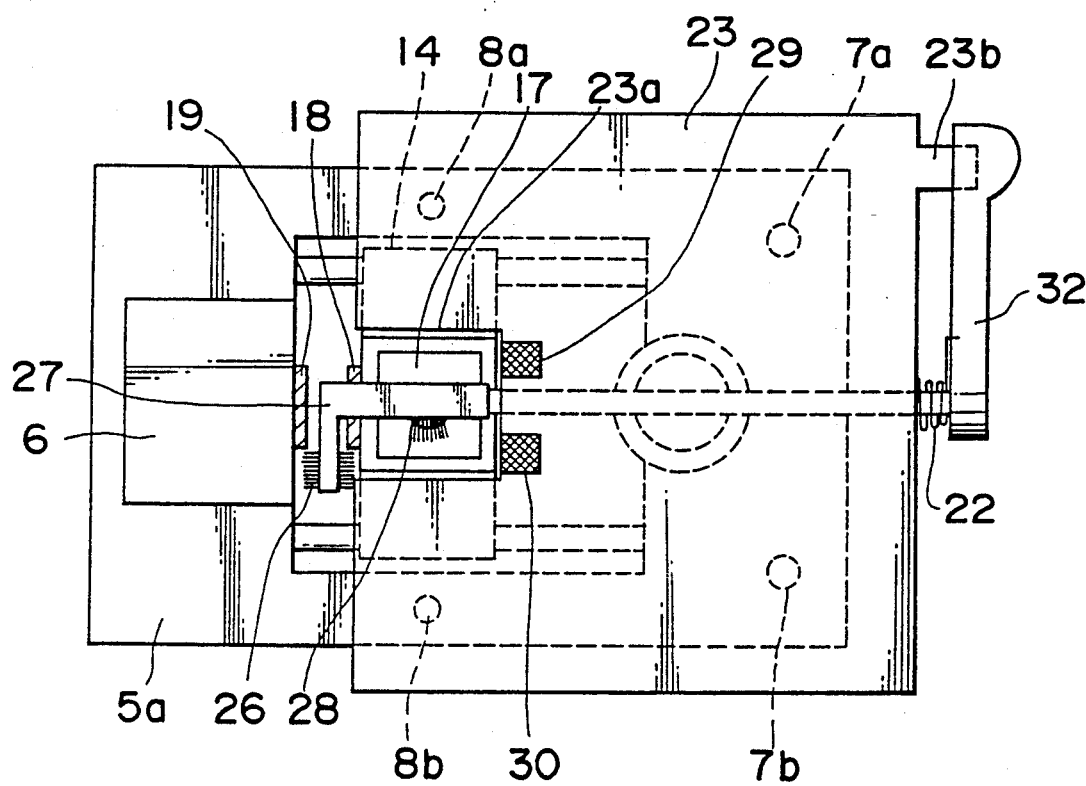
FIGS. 7(a) and 7(b) are views for illustrating the operation of an embodiment of the present invention.
Figure 7B:
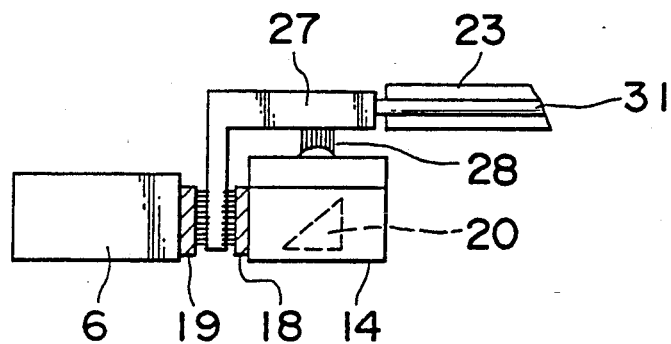
Figure 8:
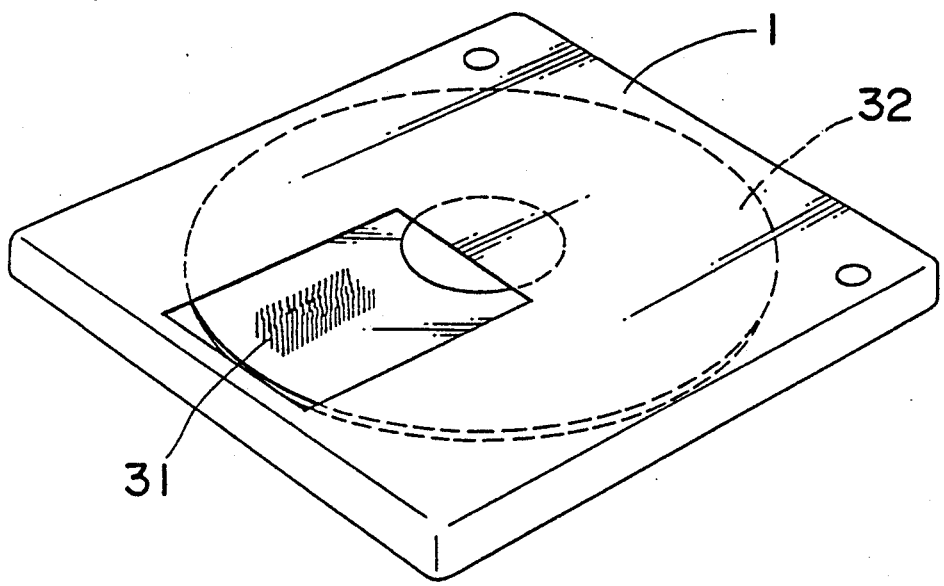
FIG. 8 is a view for illustrating a cleaner in the conventional embodiment.

FIGS. 7(a) and 7(b) show the cleaner engaged with the apparatus. The cleaner shown in FIG. 1 is inserted into a cartridge holder, and the cleaner is engaged as in the above described cartridge 1 and attains the condition shown in FIG. 7(a). The transfer base 14 is approximately secured into the notch 23a with an adsorption member 17 being attracted by the magnets 29, 30. The lever 32 is operated manually in this condition in the direction of arrow Q1 of FIG. 1, and the holder 27 pivots in direction R1 so that the object lens 28 and the glass covers 19, 18 can be cleaned. The above described operation can be easily effected from outside with an end portion of the lever side of the cleaner being exposed from the casing of the recording and reproducing apparatus.

Figure 9A:
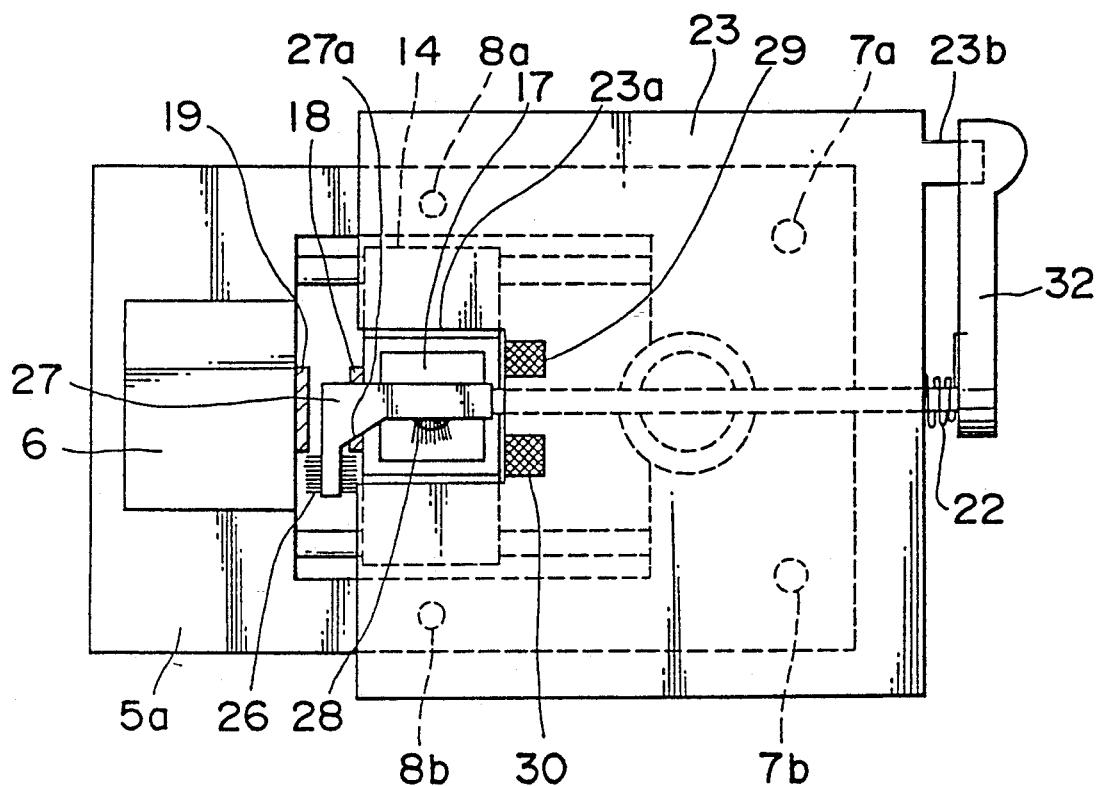
FIGS. 9(a), 9(b), 10 and 11 are views for illustrating applications of the embodiments of the present invention.
Figure 9B:
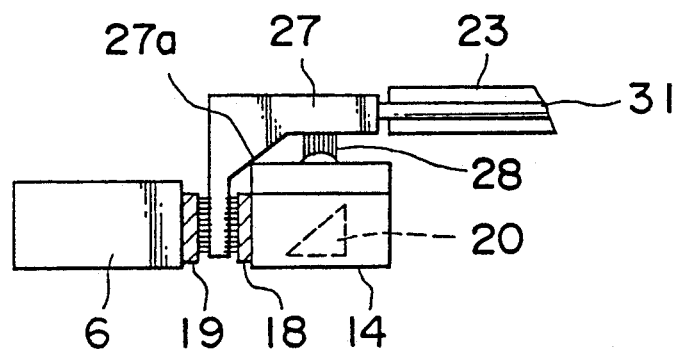

An embodiment can be provided, wherein an inclined face 27a is provided on the above described holder 27 as shown in FIGS. 9(a) and 9(b). The transfer base 14 comes into contact with the inclined face 27a, when the cleaner is engaged with the reproducing apparatus, to move the transfer base 14 in the direction Y1 into the condition shown in FIG. 9(b) independently of the magnets 29, 30, so that the cleaning operation can be effected.

When the cleaner is inserted into the cartridge holder in the condition shown in FIG. 1, the cleaner is engaged as in the above described cartridge as shown in FIG. 9(a). When the cleaner is engaged with the reproducing apparatus, and the lever 32 is rotated in the Q1 direction from outside, the transfer base 14 comes into contact with the inclined face 27a. The transfer base 27 moves in the Y1 direction in the drawing and is approximately secured into the notch 23a. Further, the lever 32 is moved manually in the direction Q2, Q1 (FIG. 1) from this condition, and the holder 27 is pivoted in the R2 and R1 directions so that the object lens 28 and the glass covers 19, 18 can be cleaned.

Figure 10:
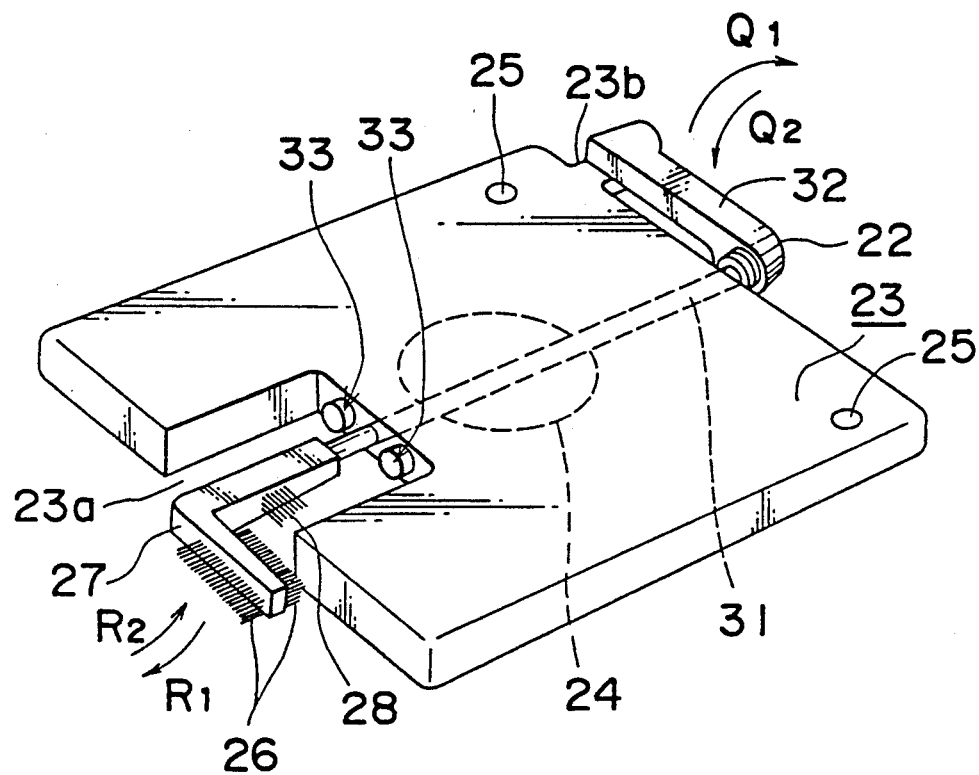

An embodiment can also be provided wherein a cushion material 33 made of an elastic material such as rubber or the like is mounted as shown in FIG. 10 at the contact portion between the notch 23a and the transfer base 14 so as to reduce the shock caused when the transfer base 14 contacts with contact portion, thereby protecting the transfer base 14. The cushion material 33 moves the lever 32 in the Q1 and Q2 directions so as to properly change the contact pressure in an oscillating manner to improve the cleaning effect.

Figure 11:
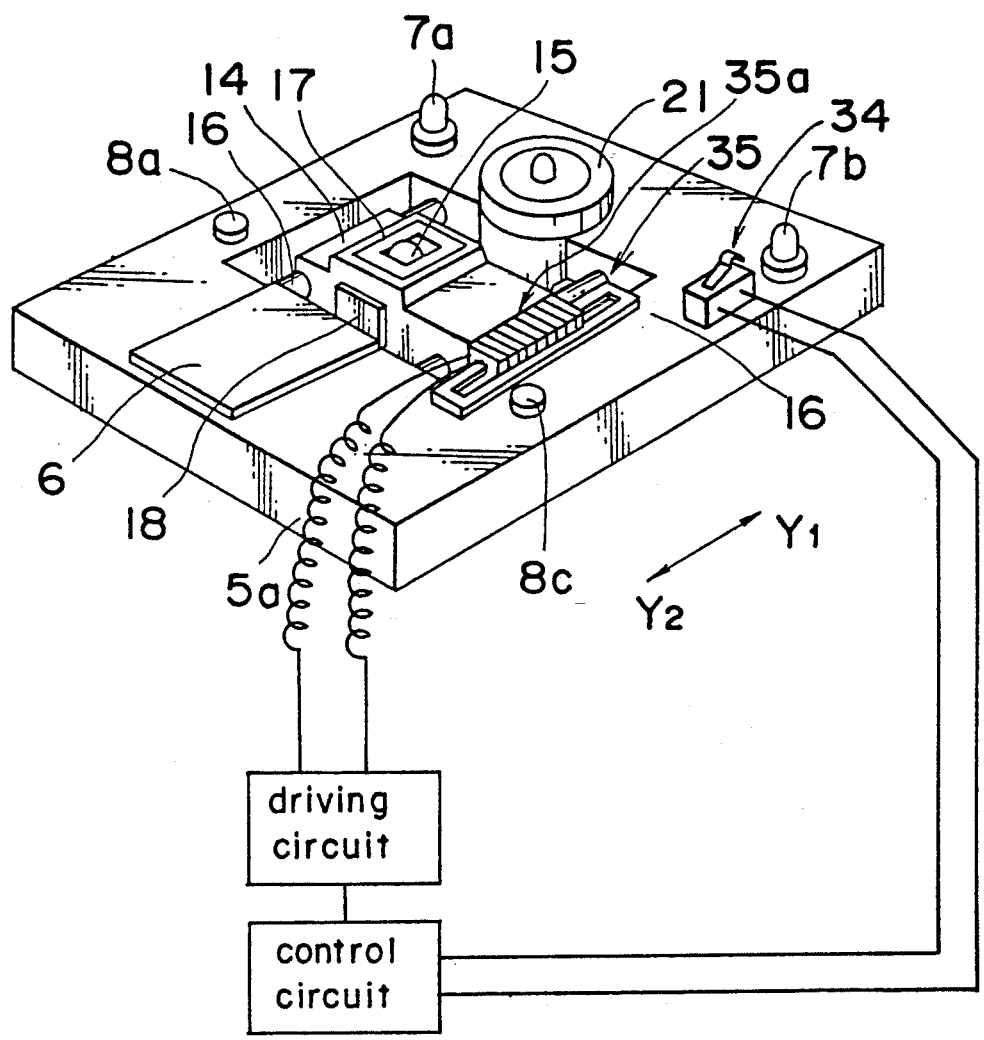

An embodiment is also provided wherein a switch 34 is mounted in the reproducing apparatus main body (as shown in FIG. 11) and detects the engagement of the cleaner to energize a linear motor of the transfer base 14 for transferring it in the Y1 direction. With this construction, the above described magnet and the inclined face are not necessary. When the housing body 23 comes into contact with the switch 34, a control circuit shown in the block diagram of FIG. 11 is operated to control the driving circuit. The coil 35a of the linear motor, which act as a transfer means, is energized to transfer the transfer base in the Y1 direction. The transfer base 14 comes into contact with the notch 23a and the transfer base 14 is approximately secured at a proper gap. Thereafter, the object lens and the glass covers can be cleaned as in the above described embodiment.

Although the present embodiment has been described for use with the optical disc apparatus, the present invention can be applied to an apparatus such an optical card or the like using media in accordance with similar recording principles.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

We claim:

1. An apparatus for use in cleaning optical components of a recording and reproducing device having a chassis, a transfer base mounted for movement relative to the chassis, a first optical component mounted on the transfer base and facing in a first direction, and a second optical component mounted on the transfer base and facing in a second direction orthogonal to the first direction, said apparatus comprising:
- a housing body adapted to be removably mounted on the chassis of the recording and reproducing device;
- a holder element movably mounted to said housing body for movement relative thereto;
- a first cleaning means, comprising a first cleaning member fixed to said holder element for movement therewith relative to said housing body, for cleaning the first optical component facing in the first direction;
- a second cleaning means, comprising a second cleaning member oriented orthogonally relative to said first cleaning member and fixed to said holder element for movement therewith and for movement with said first cleaning member relative to said housing body, for cleaning the second optical component facing in the second direction orthogonal to the first direction; and
- moving means for moving said holder element and said first and second cleaning members relative to said housing body to effect simultaneous cleaning of the first and second optical components.

2. An apparatus as recited in claim 1, further comprising:
- a transfer means for moving the transfer base into a predetermined position in which said first and second cleaning members are respectively aligned with the first and second optical components, when said housing body is mounted on the chassis of the recording and reproducing device.

3. An apparatus as recited in claim 2, wherein said transfer means comprise magnets secured to said housing body to attract the transfer base toward said housing body and into the predetermined position, when said housing body is mounted on the chassis of the recording and reproducing device.

4. An apparatus as recited in claim 2, wherein said transfer means comprises an inclined face formed on said holder element and adapted to contact the transfer base and force the transfer base into the predetermined position, when said housing body is mounted on the chassis of the recording and reproducing device.

5. An apparatus as recited in claim 2, wherein said transfer means comprises a detecting means for detecting when said housing body is mounted on the chassis of the recording and reproducing device, a driving means for driving the transfer base toward the predetermined position, and a control means for causing said driving means to operate upon detection by said detecting means that said housing body is mounted on the chassis of the recording and reproducing device.

6. An apparatus as recited in claim 1, wherein said housing body includes a contact portion which, when said housing body is mounted on the chassis of the recording and reproducing device, is adapted to abut against the transfer base to prevent movement of the transfer base beyond a predetermined position in which said first and second cleaning members are respectively aligned with the first and second optical components; and an elastic cushion member is mounted on said contact portion to absorb shock caused by contact between said contact portion and the chassis of the recording and reproducing device.

7. An apparatus as recited in claim 1, wherein
said holder element is L-shaped;
said first cleaning member comprises a first brush member mounted on a first leg of said L-shaped holder element; and
said second cleaning member comprises a second brush member mounted on a second leg of said L-shaped holder element.

8. An apparatus as recited in claim 1, further comprising:
- a shaft rotatably mounted to said housing body for rotation about a rotational axis; and
- wherein said holder element is fixed to a first end of said shaft for rotation therewith.

9. An apparatus as recited in claim 8, wherein said moving means comprises a lever fixed to a second end of said shaft such that rotation of said lever about said rotational axis causes rotation of said shaft and said holder element about said rotational axis.

10. An apparatus as recited in claim 9, further comprising:
- stopper means for limiting movement of said lever in a first rotational direction; and
- spring means for urging said lever to rotate in said first rotational direction.

11. An apparatus comprising:
a recording and reproducing device having a chassis, a transfer base mounted for movement relative to said chassis, a first optical component mounted on said transfer base and facing in a first direction, and a second optical component mounted on said transfer base and facing in a second direction orthogonal to said first direction;
- a housing body removably mounted on said chassis of said recording and reproducing device;
- a holder element movably mounted to said housing body for movement relative thereto;
- a first cleaning means, comprising a first cleaning member fixed to said holder element for movement therewith relative to said housing body, for cleaning said first optical component facing in said first direction;
- a second cleaning means, comprising a second cleaning member oriented orthogonally relative to said first cleaning member are fixed to said holder element for movement therewith and for movement with said first cleaning member relative to said housing body, for cleaning said second optical component facing in said second direction orthogonal to said first direction; and
- moving means for moving said holder element and said first and second cleaning members relative to said housing body to effect simultaneous cleaning of said first and second optical components.

12. An apparatus as recited in claim 11, further comprising:
- a transfer means for moving said transfer base into a predetermined position in which said first and second cleaning members are respectively aligned with said first and second optical components, when said housing body is mounted on said chassis of said recording and reproducing device.

13. An apparatus as recited in claim 12, wherein said transfer means comprises magnets secured to said housing body to attract said transfer base toward said housing body and into said predetermined position, when said housing body is mounted on said chassis of said recording and reproducing device.

14. An apparatus as recited in claim 12, wherein said transfer means comprises an inclined face formed on said holder element and adapted to contact said transfer base and force the transfer base into said predetermined position, when said housing body is mounted on said chassis of said recording and reproducing device.

15. An apparatus as recited in claim 12, wherein said transfer means comprises a detecting means for detecting when said housing body is mounted on said chassis of said recording and reproducing device, a driving means for driving said transfer base toward said predetermined position, and a control means for causing said driving means to operate upon detection by said detecting means that said housing body is mounted on said chassis of said recording and reproducing device.

16. An apparatus as recited in claim 11, wherein said housing body includes a contact portion which, when said housing body is mounted on said chassis of said recording and reproducing device, abuts against said transfer base to prevent movement of said transfer base beyond a predetermined position in which said first and second cleaning members are respectively aligned with said first and second optical components; and an elastic cushion member is mounted on said contact portion to absorb shock caused by contact between said contact portion and said chassis of said recording and reproducing device.

17. An apparatus as recited in claim 11, wherein said holder element is L-shaped;

said first cleaning member comprises a first brush member mounted on a first leg of said L-shaped holder element; and said second cleaning member comprises a second brush member mounted on a second leg of said L-shaped holder element.

18. An apparatus as recited in claim 11, further comprising:

a shaft rotatably mounted to said housing body for rotation about a rotational axis; and wherein said holder element is fixed to a first end of said shaft for rotation therewith.

19. An apparatus as recited in claim 18, wherein said moving means comprises a lever fixed to a second end of said shaft such that rotation of said lever about said rotational axis causes rotation of said shaft and said holder element about said rotational axis.

20. An apparatus as recited in claim 19, further comprising:

stopper means for limiting movement of said lever in a first rotational direction; and spring means for urging said lever to rotate in said first rotational direction.

* * * * *